G. F. CHURCH.
PLANT SETTING IMPLEMENT.
APPLICATION FILED SEPT. 2, 1919.

1,363,176.

Patented Dec. 21, 1920.

2 SHEETS—SHEET 1.

WITNESS:
D. W. Voorhies
F. M. Roeder

INVENTOR:
George F. Church,
BY
E. T. Silvius,
ATTORNEY.

G. F. CHURCH.
PLANT SETTING IMPLEMENT.
APPLICATION FILED SEPT. 2, 1919.
1,363,176.
Patented Dec. 21, 1920.
2 SHEETS—SHEET 2.
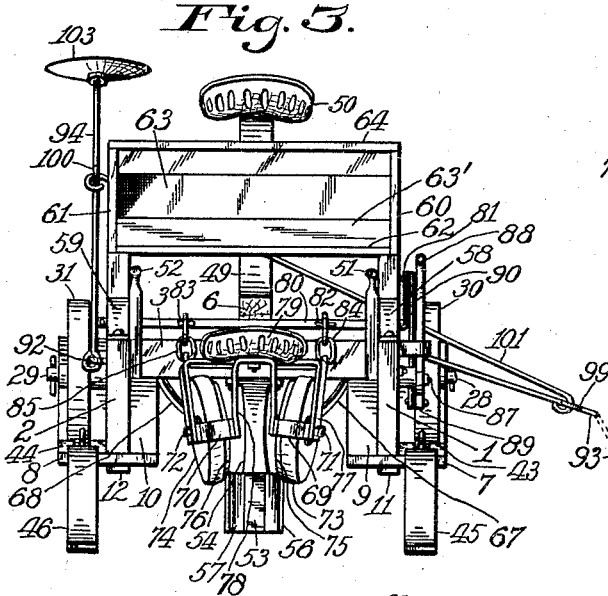
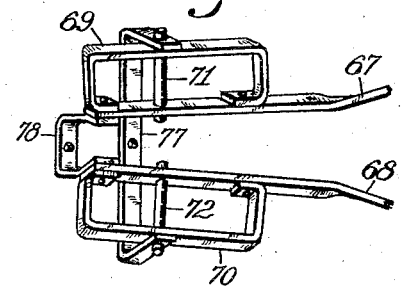
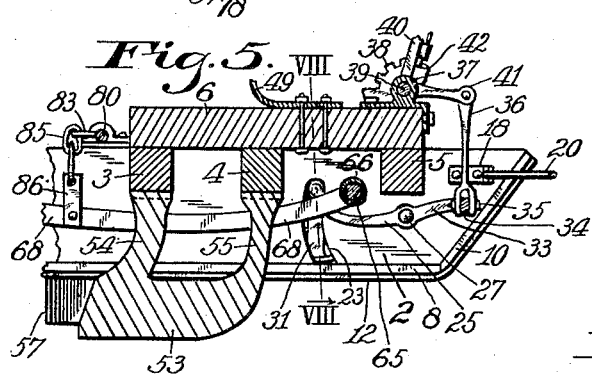
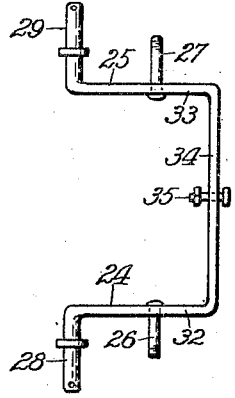
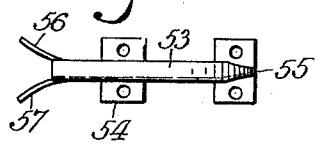
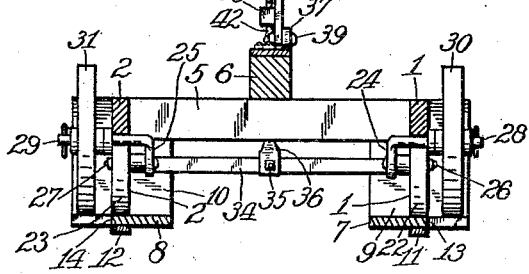
WITNESS:
O. W. Voorhies
F. M. Roeder
INVENTOR:
George F. Church,
BY
E. T. Silvius,
ATTORNEY.

UNITED STATES PATENT OFFICE.

GEORGE F. CHURCH, OF PERRY TOWNSHIP, MARION COUNTY, INDIANA.

PLANT-SETTING IMPLEMENT.

1,363,176.

Specification of Letters Patent.

Patented Dec. 21, 1920.

Application filed September 2, 1919. Serial No. 321,173.

*To all whom it may concern:*

Be it known that I, GEORGE F. CHURCH, a citizen of the United States, residing in Perry township, in the county of Marion and State of Indiana, have invented a new and useful Plant-Setting Implement, of which the following is a specification, reference being had to the accompanying drawings and to the figures of reference marked thereon.

This invention relates to an implement or machine that is designed to be used to set tomato, cabbage or other plants in a row, and the invention has reference more particularly to a plant-setting machine that is designed to slide over the ground in operation and to be drawn on wheels on roads from place to place.

An object of the invention is to provide an improved implement which shall be so constructed as to be adapted to efficiently secure the plants firmly in place when set in the ground by an attendant. Another object is to provide an improved plant-setter of such construction as to be capable of being readily adjusted so as to operate to the best advantage under different conditions of the ground in which the planting is done. A further object is to provide an improved plant-setting machine having improved means for marking the rows where the plants are to be set, and which shall be of simple and inexpensive construction and be durable and economical in use.

With the above-mentioned and other objects in view, the invention consists in the plant-setting implement having improved features of construction, and in the novel parts and combinations and arrangements of parts as hereinafter particularly described and further set forth in the accompanying claims.

Figure 1:
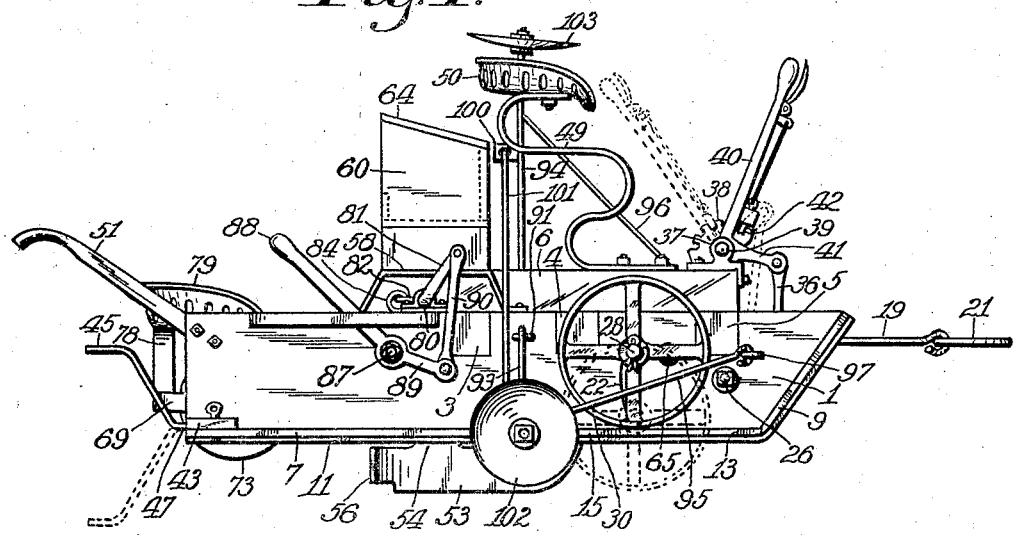
Figure 2:
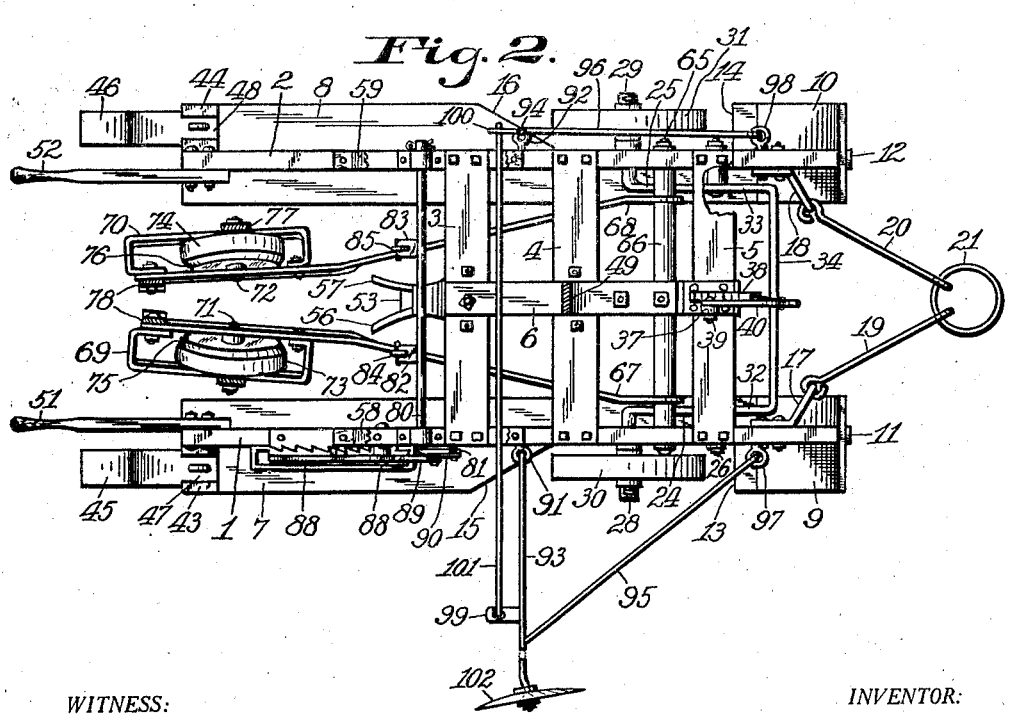

Referring to the drawings,—Figure 1 is a side elevation of the improved plant-setting machine; Fig. 2 is a top plan of the machine minus some of the upper parts elsewhere clearly illustrated; Fig. 3 is a rear elevation of the plant-setting implement; Fig. 4 is an inverted plan view of an improved frame embodied in the machine; Fig. 5 is a fragmentary vertical central section of the forward portion of the machine; Fig. 6 is a plan of a wheel frame embodied in the machine; Fig. 7 is an inverted plan of the furrow-opener comprised in the machine; and, Fig. 8 is a fragmentary section approximately on the line VIII—VIII in Fig. 5.

Similar reference characters in the different figures of the drawings indicate like elements or features of construction herein referred to in detail.

The invention as preferably constructed comprises a suitable sled which has two runners comprising main parts 1 and 2 respectively to which transverse beams 3, 4 and 5 are secured and upon which a center beam 6 is secured so as to extend longitudinally equidistant from the runners. The runners preferably comprise also relatively broad flat bottoms 7 and 8 and inclined front portions 9 and 10 respectively which may be composed of wood and provided on the under side with metallic shoes 11 and 12 respectively. Preferably the broad bottoms have recesses 13 and 14 in their outer portions to receive carrying wheels, the forward portions of the bottoms at the rear ends of the recesses having sloping edges 15 and 16 respectively. The inner sides of the forward portions of the main parts 1 and 2 are provided with lugs 17 and 18 respectively to which links 19 and 20 are connected that are connected to a draft ring 21 whereby to pull the machine. Preferably the main parts 1 and 2 of the runners have vertically arranged slots 22 and 23 therein respectively. A wheel frame is provided which comprises arms 24 and 25 having pivots 26 and 27 that are mounted on the parts 1 and 2 forward of the slots, respectively, the arms having stub axles 28 and 29 thereon that extend through the slots respectively, carrying wheels 30 and 31 being mounted on the axles respectively; and the wheels may be lowered or raised by means of arms 32 and 33 rigidly connected with the arms 24 and 25 respectively, and rigidly connected to a tie bar 34 provided with a suitable connecting bolt 35 to which a stiff link 36 is connected; and a stand 37 and a quadrant 38 are mounted on the central beam 6 and provided with a pivot 39 to which is connected a lever 40 having an arm 41 that is connected to the link 36, the lever being provided with a latch 42 to operate in connection with the quadrant. When the wheels are lowered they prevent the forward portions of the runners from sliding on the ground. For holding up the rearward portion of the runners on roadways the runners are provided with keepers 43 and 44 respectively to which runner extensions 45 and 46 having shanks 47 and 48 are respectively connected so as to be reversible, the bearing portions of the extensions being off-set so as to be clear of the ground when carried in inverted position.

A suitable elastic seat-support 49 is secured to the center beam 6 and supports a seat member 50 to be used by the driver of the machine. Preferably the rearward portions of the runners are provided with handles 51 and 52 respectively which in some cases may be used by a person walking on the ground for managing the machine.

A single furrow-opener is provided and comprises a runner 53 adapted to be forced into the ground and having standards 54 and 55 that are secured to the under side of the transverse beams 3 and 4 respectively, the rearward end of the runner having flaring wings 56 and 57 to suitably widen the furrow or trench to receive the plants.

A commodious plant carrier is provided rearward of the seat member 50 and preferably is secured to suitable legs 58 and 59 mounted upon the runners, the plant carrier having ends 60 and 61, a bottom 62, a front 63, a low back 63′ and a top 64.

A shaft 65 is connected to the runner parts 1 and 2 and has spacing thimbles 66 thereon between which beams 67 and 68 are connected to the shaft and extend rearwardly under the beams 3 and 4 to constitute parts of a frame for the furrow-closers, the beams having yokes 69 and 70 thereon respectively. An axle 71 is connected to the beam 67 and the yoke 69 and a like axle 72 is connected to the beam 68 and the yoke 70. Rollers 73 and 74 are mounted on the axles respectively and have beveled edges 75 and 76 respectively at their relatively adjacent sides. An arch 77 is secured to the outer sides of the yokes 69 and 70 and another arch 78 is secured to the beams 67 and 68 and couples the beams together, and a seat member 79 is secured upon the arches to carry the operator whose weight assists in enabling the rollers to pack the earth to the plants. In order to adjust the furrow-closers in height relatively to the machine, a shaft 80 is rotatably mounted upon the runners and has a crank arm 81 rigid thereon, the shaft having also rearwardly extending arms 82 and 83 rigid thereon that support links 84 and 85 respectively that are connected to ears 86 secured to the beams 67 and 68 respectively.

One runner part supports a pivot 87 on which a lever 88 is mounted that has an arm 89 to which a link 90 is connected, the link being connected also with the crank arm 81. A toothed latch bar is secured to the runner to be engaged by the lever 88, as is customary when levers are required to be latched.

The outer sides of the runners are provided with eyes 91 and 92 to which arms 93 and 94 of suitable length are respectively connected and provided with brace rods 95 and 96 that are connected to eyes 97 and 98 which are connected to the runners forward of the other eyes. The arms are provided with ears 99 and 100 respectively to which a coupling rod 101 is connected, and marker disks 102 and 103 are rotatably mounted on the arms 93 and 94 respectively, so that each disk shall be adapted to roll on the ground at the desired distance from the middle of the machine. The coupling rod is of such length as to hold one of the beams in upright position when the other beam is extended in use.

In practical use the plants are arranged in the plant carrier so as to be within easy reach of the operator riding on the seat member 79. As the machine is drawn forward a furrow or trench of suitable depth is opened by the runner 53, permitting the operator to set the plants between the wings 56 and 57 as the machine advances, the rollers 73 and 74 closely following and forcing the earth back into the furrow and so as to cover the roots of the plants, the beveled edges of the roller efficiently pressing the earth up to the plants while the rollers, which are suitably arranged have a tendency to draw the earth inward into the furrow, the axles of the rollers being suitably tilted. When the machine is in operation one of the marker disks is lowered so as to mark a line on the ground parallel with the course of the machine to indicate where to open the furrow for the next adjacent row of plants. During operation of the machine the lever 40 is set in forward position so as to tilt the wheel frame and carry the wheels 30 and 31 free from the ground. When required the lever 88 may be readjusted to raise or lower the furrow closers, as will be understood.

Having thus described the invention, what is claimed as new is—

1. A plant-setting implement including a frame having runners and also adjustably-arranged carrying wheels, each runner having a removable extension on the rear end thereof to assist the wheels to carry the frame, a furrow-opener secured to the frame, and a furrow-closer connected with the frame.

2. A plant-setting implement including a frame having two runners, a furrow-opener secured to the frame, a furrow-closer connected with the frame, two arms pivotally connected to the runners respectively, a tie rod connected to the two arms to hold one of the arms uprightly when the other arm is extended outwardly, and two marker disks rotatable on the arms respectively.

3. A plant-setting implement including a frame having two runners, a furrow-opener secured to the frame between the runners, a plant-carrier mounted on the frame above the furrow-opener, a furrow-closer arranged between the runners and having two beams pivotally connected with the runners respectively, an operator's seat mounted on the furrow-closer rearward of the furrow-opener, a driver's seat mounted on the frame forward of the plant-carrier, a controlled wheel frame adjustably connected with the runners, and wheels mounted on the wheel frame.

4. In a plant-setting implement, the combination of two runners, frame members secured to the runners, a furrow-opener secured to the frame members between the runners, a furrow-closer having beams pivotally connected with the runners, an arm pivotally connected to one of the runners and having a brace rod connected thereto that is pivotally connected also to said runner forward of the arm, and a marker disk rotatable on the end of the arm.

5. In a plant-setting implement, the combination of two runners, frame members secured to the runners, a furrow-opener secured to the frame members, a furrow-closer having connection with the runners, a wheel frame pivotally connected with the runners and comprising axles and a tie-bar on opposite sides respectively of the pivotal axis of the frame, wheels on the axles, a lever mounted on one of the frame members and operatively connected with said tie-bar, and means for latching the lever.

6. In a plant-setting implement, the combination with a movable frame, and a furrow-opener secured to the frame, of a furrow-closer comprising two beams adjacently-arranged and pivotally connected with the movable frame, each beam having a yoke on its outer side, two rollers rotatably connected with the beams respectively and also with the yokes thereof, an arch secured to the two beams, an arch secured to the yokes of the beams, and an operator's seat secured upon the arches.

7. In a plant-setting implement, the combination of two runners, frame members secured to the runners, a furrow-closer having two beams pivotally connected with the runners respectively, a furrow-opener between said beams and secured to the frame members, a shaft rotatably mounted on the runners and having two adjusting-arms and also a crank-arm thereon, links connected with the adjusting-arms and said beams respectively, a controlling-lever mounted on one of the runners, and a link connected with the controlling-lever and said crank-arm.

In testimony whereof, I affix my signature in presence of two witnesses.

GEORGE F. CHURCH.

Witnesses:
  E. T. SILVIUS,
  F. M. ROEDER.